(12) United States Patent
Stovall

(10) Patent No.: US 11,666,955 B2
(45) Date of Patent: Jun. 6, 2023

(54) SYSTEM AND METHOD FOR OBTAINING MINERAL RICH POWDER FROM ELECTRONIC WASTE

(71) Applicant: JABIL INC., St. Petersburg, FL (US)

(72) Inventor: Zakk Stovall, Southaven, MS (US)

(73) Assignee: JABIL INC., St. Petersburg, FL (US)

( * ) Notice: Subject to any disclaimer, the term of this patent is extended or adjusted under 35 U.S.C. 154(b) by 242 days.

(21) Appl. No.: 16/560,142

(22) Filed: Sep. 4, 2019

(65) Prior Publication Data

US 2021/0060627 A1    Mar. 4, 2021

(51) Int. Cl.
| | |
|---|---|
| *B09B 3/80* | (2022.01) |
| *B02C 17/10* | (2006.01) |
| *B02C 18/14* | (2006.01) |
| *B02C 23/10* | (2006.01) |
| *B03B 9/06* | (2006.01) |
| *C22B 11/00* | (2006.01) |

(Continued)

(52) U.S. Cl.
CPC ............... *B09B 3/80* (2022.01); *B02C 17/10* (2013.01); *B02C 18/142* (2013.01); *B02C 23/10* (2013.01); *B03B 9/061* (2013.01); *C22B 11/046* (2013.01)

(58) Field of Classification Search
CPC ....... B02C 17/08; B02C 17/10; B02C 18/142; B02C 23/08; B02C 23/10; B02C 23/38; B09B 3/0016; B09B 3/00; B03B 9/061; C22B 11/046; C22B 7/005; Y02P 10/20
See application file for complete search history.

(56) References Cited

U.S. PATENT DOCUMENTS

| | | | |
|---|---|---|---|
| 3,682,399 A | 8/1972 | Kaspar et al. | |
| 4,166,583 A * | 9/1979 | Ruckstuhl | B02C 13/20 |
| | | | 241/154 |

(Continued)

FOREIGN PATENT DOCUMENTS

| | | | |
|---|---|---|---|
| CN | 107774411 A | * | 3/2018 |
| CN | 108620166 A | * | 10/2018 |

(Continued)

OTHER PUBLICATIONS

Mobile Noise Barriers, retrieved date Oct. 30, 2021.*

(Continued)

*Primary Examiner* — Shelley M Self
*Assistant Examiner* — Mohammed S. Alawadi
(74) *Attorney, Agent, or Firm* — Shumaker, Loop & Kendrick, LLP; James D. Miller

(57) ABSTRACT

Ways of obtaining a mineral rich powder from an electronic waste substrate include a shredder configured to receive the electronic waste substrate and process the electronic waste substrate into a plurality of fragments. A mill is provided that includes a container configured to receive the plurality of fragments, the container including a milling media, the mill configured to abrade the plurality of fragments with the milling media to produce a milled product. A separator is provided that is configured to receive the milled product, where the separator is configured to apply a predetermined size selection to the milled product to provide a first output including a plurality of particles and a second output including a plurality of abraded fragments. A skid is coupled to and provides structural support for the shredder, the mill, and the separator.

16 Claims, 6 Drawing Sheets

(51) Int. Cl.
 *C22B 7/00* (2006.01)
 *B09B 3/00* (2022.01)

(56) References Cited

U.S. PATENT DOCUMENTS

| | | | |
|---|---|---|---|
| 4,734,171 A | | 3/1988 | Murphy |
| 4,859,293 A | | 8/1989 | Hirako et al. |
| 5,127,963 A | | 7/1992 | Hartup et al. |
| 5,468,291 A | * | 11/1995 | Waterson ............ C04B 18/0481 |
| | | | 106/713 |
| 10,526,682 B2 | | 1/2020 | Nelson et al. |
| 2005/0109163 A1 | | 5/2005 | Marsden et al. |
| 2011/0290919 A1 | * | 12/2011 | Barberi ................... B02C 23/10 |
| | | | 241/25 |
| 2013/0276284 A1 | | 10/2013 | Brosseau et al. |
| 2013/0306767 A1 | * | 11/2013 | Becker .................... B02C 18/24 |
| | | | 241/37.5 |
| 2014/0212346 A1 | | 7/2014 | Xia |
| 2015/0050199 A1 | | 2/2015 | Korzenski et al. |
| 2015/0122927 A1 | * | 5/2015 | Boehlefeld ........... B02C 18/182 |
| | | | 29/401.1 |
| 2016/0102383 A1 | | 4/2016 | Hymer et al. |
| 2016/0122846 A1 | | 5/2016 | Korzenski et al. |
| 2016/0362804 A1 | | 12/2016 | Chen et al. |
| 2016/0369371 A1 | * | 12/2016 | Conway .................. B02C 23/14 |
| 2017/0079146 A1 | | 3/2017 | Brosseau et al. |
| 2017/0170532 A1 | | 6/2017 | Blais et al. |
| 2017/0259270 A1 | * | 9/2017 | Watkins ................. B02C 13/282 |
| 2017/0369967 A1 | | 12/2017 | Nelson et al. |
| 2019/0022662 A1 | * | 1/2019 | Conway .................. B02C 23/14 |
| 2021/0277498 A1 | * | 9/2021 | Valerio ................... B03B 9/061 |

FOREIGN PATENT DOCUMENTS

| | | |
|---|---|---|
| JP | 2005154892 A | 6/2005 |
| WO | 2013090517 A1 | 6/2013 |

OTHER PUBLICATIONS

Mesh Sizing Chart for strainers, retrieved date Aug. 20, 2022. https://www.valvesonline.com.au/references/mesh-sizing-chart/.*
Dust Collection Research—Equipment, retrieved date Aug. 21, 2022. http://billpentz.com/woodworking/cyclone/equipment.php.*
English translate (CN107774411A), retrieved date Aug. 21, 2022.*
English translate (CN108620166A), retrieved date Aug. 21, 2022.*
International Search Report & Written Opinion of Interational Searching Authority dated Jun. 20, 2019 for International Application No. PCT/US2019/021786 filed Mar. 12, 2019; 12 pages.
PCT Notification of Transmittal of the International Search Report and the Written Opinion of the International Search Authority, or the Declarations. dated Aug. 2, 2019. 13 pages.

* cited by examiner

SYSTEM AND METHOD FOR OBTAINING MINERAL RICH POWDER FROM ELECTRONIC WASTE

FIELD

The present technology relates to systems and methods for processing an electronic waste substrate, such as printed circuit boards, to recover a mineral rich powder and substrate fragments.

BACKGROUND OF THE INVENTION

This section provides background information related to the present disclosure which is not necessarily prior art.

Various processes can be used to extract minerals and metals from electronic waste. For example, Patent Cooperation Treaty Application No. WO2013090517, titled, "Apparatus and Method for Stripping Solder Metals During the Recycling of Waste Electrical and Electronic Equipment;" United States Patent Application Publication No. 2013/0276284, titled "Method for Recycling of Obsolete Printed Circuit Boards," and United States Patent Application Publication No. 2017/0369967, titled "Methods, Materials and Techniques for Precious Metal Recovery," are directed to largely manual or otherwise less efficient methods of extracting metals from electronic waste equipment, such as from printed circuit boards associated with electrical and electronic equipment. As detailed in the foregoing and like references, certain electronic waste products, such as printed circuit boards, can include components having one or more various metals, where such components can include, for example, pins, connectors, contacts, and the like. It can be desirable to extract minerals including metals from such electronic waste in order to recover and reuse the minerals. However, ways of extracting metals from electronic waste can often include custom or site-specific facilities to process electronic waste, where certain stepwise mechanical and/or chemical processes are performed at various times and at various locations. Such processing of electronic waste can also generate nonuniform outputs that can complicate recovery and recycling efforts.

SUMMARY OF THE INVENTION

The present technology includes systems and processes that relate to recovery of a mineral rich powder from an electronic waste substrate, such as a printed circuit board, to facilitate recovery and recycling of minerals and metals therefrom.

Systems and methods for obtaining a mineral rich powder from an electronic waste substrate are provided that include or utilize a shredder, a mill, a separator, and a skid. The shredder is configured to receive the electronic waste substrate and process the electronic waste substrate into a plurality of fragments. The mill includes a container configured to receive the plurality of fragments. The container includes a milling media. The mill is configured to abrade the plurality of fragments with the milling media to produce a milled product. The separator is configured to receive the milled product, where the separator is configured to apply a predetermined size selection to the milled product to provide a first output including a plurality of particles and a second output including a plurality of abraded fragments. The skid is coupled to and provides structural support for the shredder, the mill, and the separator.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
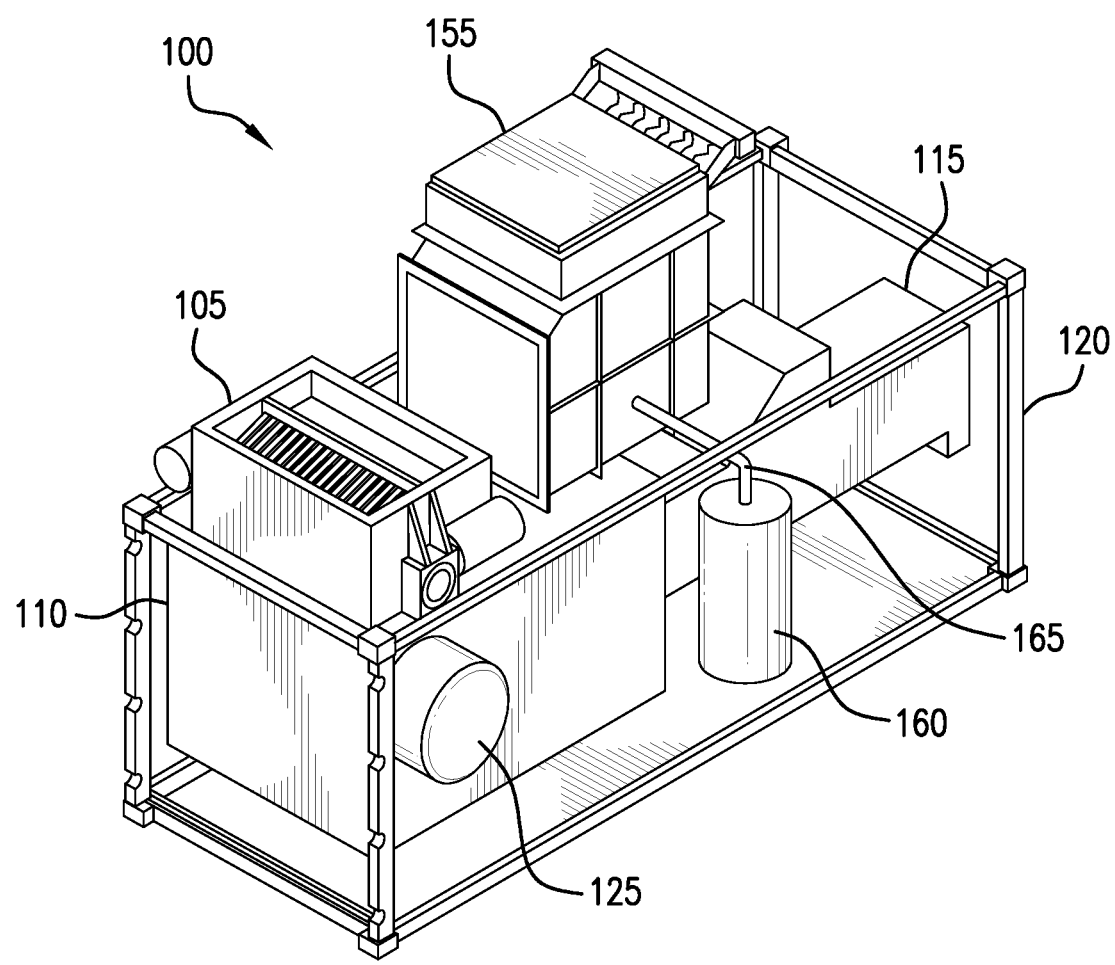
FIG. 1 is a perspective view of an embodiment of a system for obtaining a mineral rich powder from an electronic waste substrate.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides ways to obtain a mineral rich powder from an electronic waste substrate. Various types of electronic devices have limited lifespans and can be rendered inoperable, damaged, or obsolete. Certain types of electronic devices can include electronic data storage, where it can be desirable to permanently destroy such electronic data when the electronic device is no longer in use. Many electronic devices include one or more printed circuit boards or other components that include various pins, connectors, contacts, and the like that include minerals, such as metals. Recovery and reuse of such minerals can be economically and environmentally advantageous. What is more, uniform processing of electronic waste can provide uniform output streams that can allow optimization and standardization in reclaiming minerals and metals from electronic waste.

An electronic waste substrate, as referred to herein, includes various electronic devices and components, such as computers, computer components, monitors, displays, televisions, mobile phones and devices, electronic tablets, and similar products. Many electronic devices and components include one or more printed circuit boards. Such printed circuit boards can be manufactured in various ways, including by laminating a dry film on copper foil, which can be supported on a fiberglass plate matrix, for example. The film can be exposed with a film negative of the circuit board design and an etcher can be used to remove unmasked copper foil from the plate. Solder can then be applied over the unetched copper on the board. Depending upon the use and design of the particular printed circuit board, various other minerals and metals can be used in the manufacturing process, including lead, tin, nickel, iron, zinc, aluminum, silver, gold, platinum, palladium, and mercury. Printed circuit boards can also include additional components, such as transistors, capacitors, heat sinks, integrated circuits, resistors, integrated switches, processors, etc. where these additional components can include various minerals and metals. In addition to various types of electronic waste substrates, including printed circuit boards, the present systems and methods can be used to obtain a mineral rich powder from other mineral and metal containing materials. Examples include various materials plated with metals, such as connectors, pins, industrial precious metal scrap, bulk jewelry scrap, and other materials including one or more minerals and metals, such as gold, silver, platinum, palladium, rhodium, aluminum, titanium, stainless steel, carbon steel, copper, brass, bronze, etc. Embodiments of the present technology can therefore be used to obtain a mineral rich powder from an electronic waste substrate alone, other mineral and metal containing materials alone, or a mixture of electronic waste and mineral and metal containing materials.

The present technology includes systems and processes that can reduce the size and concentrate the value of such electronic waste. Components of the systems described herein can be assembled and integrated into unitized structures that can be readily moved or transported to generate uniform outputs amendable to optimized and standardized recovery and recycling processes. One or more unit structures each containing a system for obtaining a mineral rich powder from electronic waste can be deployed to a site based upon the amount of electronic waste material to be processed. In this way, the footprint of the system(s) can be optimized for a particular location or facility, for example.

Systems for obtaining a mineral rich powder from an electronic waste substrate are provided that include a shredder, a mill, a separator, and a skid. The shredder is configured to receive the electronic waste substrate and process the electronic waste substrate into a plurality of fragments. The mill includes a container configured to receive the plurality of fragments. The container includes a milling media. The mill is configured to abrade the plurality of fragments with the milling media to produce a milled product. The separator is configured to receive the milled product, where the separator is configured to apply a predetermined size selection to the milled product to provide a first output including a plurality of particles and a second output including a plurality of abraded fragments. For example, each particle can be smaller than each fragment, where the predetermined size selection retains fragments of a certain size and allows particles less than the certain size to pass through. The skid is coupled to and provides structural support for the shredder, the mill, and the separator.

The shredder can be configured to process the electronic waste substrate into a plurality of substantially uniform fragments. Each of the substantially uniform fragments can have a longest dimension of about 1 inch. For example, the substantially uniform fragments can be discs or chips from one or more printed circuit boards, where the discs or chips have a maximum diameter of about 1 inch.

The mill can include a cylindrical container that is agitated by an electric motor. The milling media within the container can include one or more rods. The one or more rods can include one or more metal rods having diameters ranging from about ¾ inch to about 2 inches. In certain embodiments, the milling media includes one or more rods having about a ¾ inch diameter and one or more rods having about a 2 inch diameter.

The separator can include a sieve to provide the predetermined size selection to the milled product. The sieve can allow the plurality of particles to pass therethrough to provide the first output and can retain the plurality of abraded fragments to provide the second output. In certain embodiments, the sieve can have a mesh size not greater than about 3.

The skid can be configured to fit within a shipping container. As such, where the system includes a shipping container, the skid can be disposed therein. The shipping container can be a "20 foot" shipping container having a length of about 20 feet, a width of about 8 feet, and a height of about 8.5 feet. A sound damping material can be coupled to one or both of the skid and the shipping container.

A dumper can be included in the system where the dumper is configured to provide the electronic waste substrate to the shredder. For example, the dumper can be configured to elevate the electronic waste substrate and provide the electronic waste substrate to the shredder using gravity. That is, the dumper can lift the electronic waste substrate and dump it into the shredder.

A dust collector can be included in the system that is configured to collect and store airborne dust generated by the system. An air compressor can be provided that is fluidly coupled to the dust collector to remove dust from one or more filters of the dust collector. In this way, the dust collector can regenerate or reuse one or more filters used to capture dust. Captured dust can be directed to and combined with the first output of the separator that includes the plurality of particles.

The system can include a controller configured to control operation of the shredder, the mill, and the separator. Where applicable, the controller can also control operation of the dumper, the dust collector, and/or the air compressor. The controller can include various status indicators and diagnostics; e.g., on/off, component timers, hour meters, batch counters, maintenance reminders, speed/pressure meters, etc.

Methods for obtaining a mineral rich powder from an electronic waste substrate are provided that can employ the various systems provided herein. Such methods can include receiving the electronic waste substrate with a shredder and processing the electronic waste substrate into a plurality of fragments. The plurality of fragments can be received in a container of a mill, the container can include a milling media, and the mill can abrade the plurality of fragments with the milling media to produced a milled product. The milled product can be received by a separator, where the separator can apply a predetermined size selection to the milled product to provide a first output including a plurality of particles and a second output including a plurality of abraded fragments. A skid can be coupled to and can provide structural support for the shredder, the mill, and the separator.

With reference now to FIGS. 1-6, an embodiment of a system 100 for obtaining a mineral rich powder from an electronic waste substrate is shown. The system 100 can include a shredder 105, a mill 110, a separator 115, and a skid 120. The shredder 105 can be configured to receive the electronic waste substrate and process the electronic waste substrate into a plurality of fragments. The mill 110 can include a container 125 configured to receive the plurality of fragments. The container 125 can include a milling media 130. The mill 110 can be configured to abrade the plurality of fragments with the milling media 130 to produce a milled product. The separator 115 can be configured to receive the milled product, where the separator 115 is configured to apply a predetermined size selection to the milled product to provide a first output including a plurality of particles and a second output including a plurality of abraded fragments. The skid 120 is coupled to and provides structural support for the shredder 105, the mill 110, and the separator 115.

Figure 3:
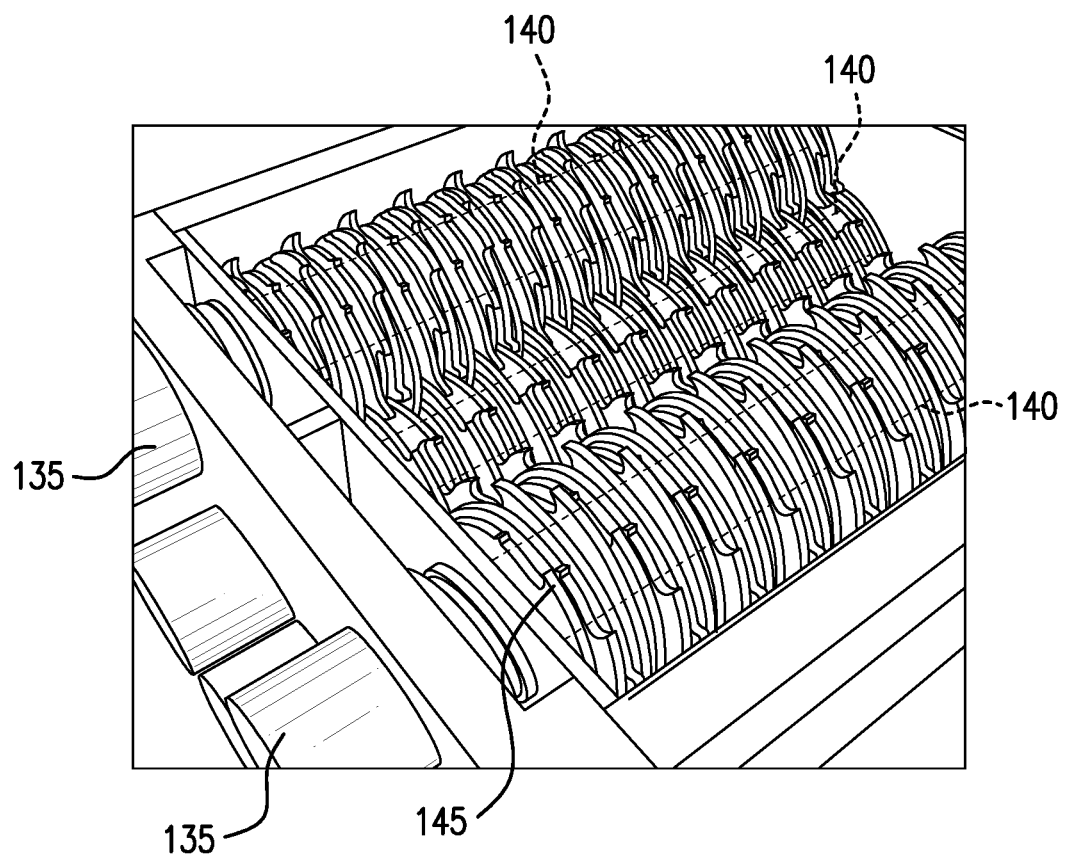
FIG. 3 is a perspective view of a portion of a shredder of the system, showing electric motors configured to drive cutting shafts having spaced cutting elements along a length thereof.

Aspects of the shredder 105 can include the following features. The shredder 105 can be configured to process the electronic waste substrate into a plurality of substantially uniform fragments. Each of the substantially uniform fragments can have a longest dimension of about 1 inch. For example, the substantially uniform fragments can be discs or chips from one or more printed circuit boards, where the discs or chips have a maximum diameter of about 1 inch. The shredder 105 can include one or more electric motors 135 configured to rotate one or more cutting shafts 140. In certain embodiments, the shredder 105 can include four cutting shafts 140. As shown in the embodiment of FIG. 3, the cutting shafts 140 include spaced cutting elements 145 along a length thereof. Spacing of the cutting shafts 140, spacing of the cutting elements 145 on the cutting shafts 140, and/or the degree of intermeshing of the cutting elements 145 between different cutting shafts 140 can be tailored to provide a predetermined size of milled product. The shredder 105 can also include one or more apertures, for example provided by a grate or screen, in order to retain the electronic waste substrate in contact with the cutting shafts 140 and spaced cutting elements 145 until a particular fragment size is achieved. In this way, the one or more apertures of the shredder 105 can further facilitate processing of the electronic waste substrate into substantially uniform fragments. For example, the shredder 105 can be configured to process a printed circuit board into substantially uniform discs or chips approximately 1 inch in diameter. Uniform size reduction of the electronic waste substrate by the shredder 105 can significantly improve the subsequent action of the mill 110 upon the fragments of shredded electronic waste. Examples of the shredder 105 include those manufactured by Shred-Tek (Cambridge, Ontario, Canada).

Figure 4:
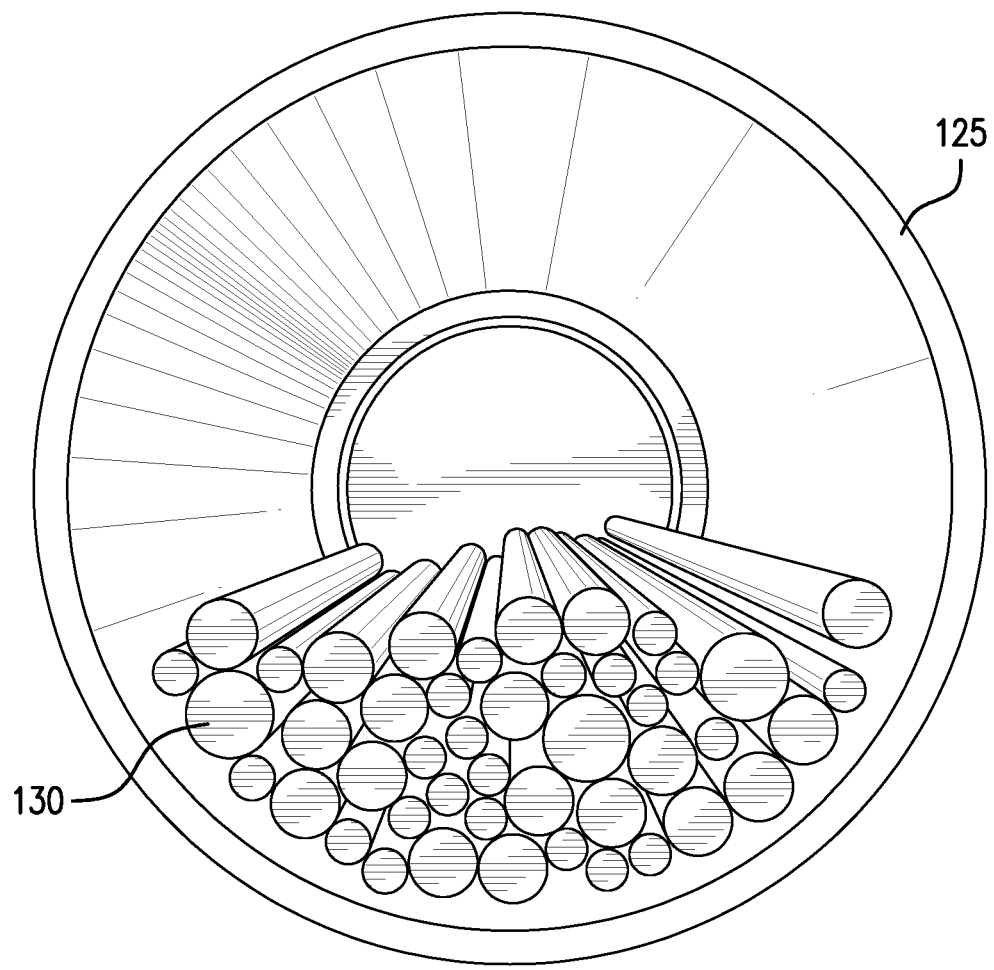
FIG. 4 is a side elevational view of a container of a mill of the system, where the mill includes a milling media in the form of different sized rods.
Figure 5:
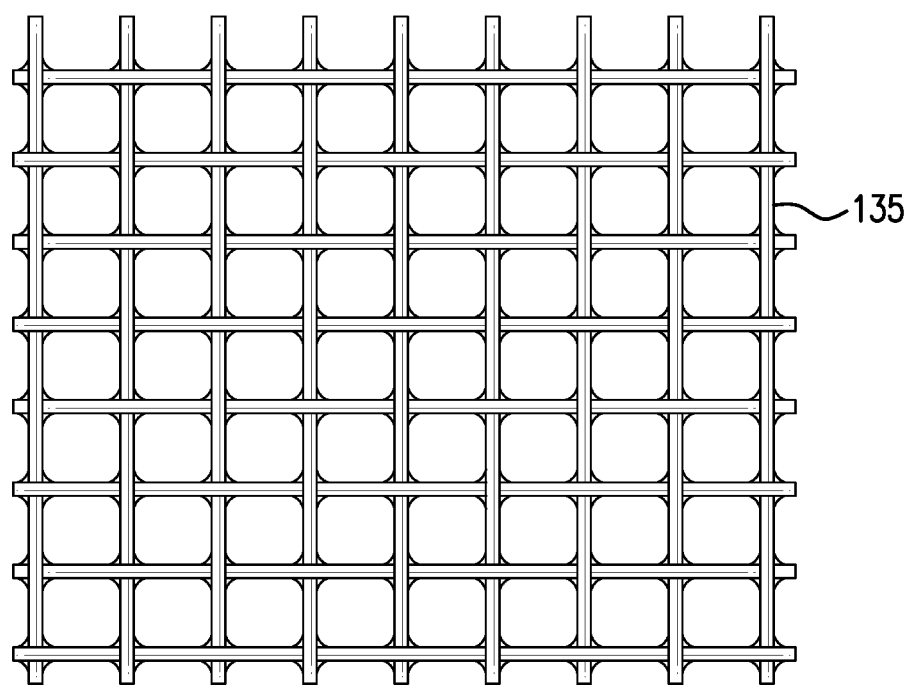
FIG. 5 is a representation of a portion of a sieve used in a separator of the system.

Aspects of the mill 110 can include the following features. The mill 110 can include a container 125, such as a cylindrical container as shown, that is agitated by an electric motor and certain gearing (not shown). For example, the mill 110 can be configured to rotate the container 125 about a central axis or can be configured to rotate in other ways, including elliptical and planetary rotational movements. Other embodiments include where the container 125 can be shaken or vibrated with certain frequencies. It is possible that the container 125 has other shapes, including elliptical and polygonal cross-sections; e.g., a hexagonal cross-section. The milling media 130 within the container 125 can include various types and shapes of grinding media that can repeatedly impact fragments of electronic waste within the container 125 as the container 125 is agitated or rotated. Examples of milling media 130 include balls (e.g., steel or ceramic balls) and other shapes. In certain embodiments, the milling media 130 within the container 125 can include one or more rods, as shown in FIG. 4. The one or more rods of the milling media 130 can include one or more metal rods having various diameters and lengths, where the length can be sized upon the interior length of the container 125. Where the milling media 130 includes metal rods, diameters of such metal rods can range from about ¾ inch to about 2 inches. In certain embodiments, the milling media 130 includes rods having different diameters, including where the milling media 130 includes one or more rods having about a ¾ inch diameter and one or more rods having about a 2 inch diameter. Where the milling media 130 includes rods, it has been advantageously found that discs or chips of fragments of electronic waste are more effectively abraded than when other forms of milling media 130 are used. Without being limited by theory, it is thought that faces of the discs or chips can slide between the rods while the container 125 is agitated and experience a more complete and faster abrasion versus other types of milling media 130. Examples of the mill 110 include those manufactured by MicroGrinding Systems (Little Rock, Ark.).

Aspects of the separator 115 can include the following features. The separator 115 can include a sieve 135 to apply the predetermined size selection to the milled product, where the sieve 135 can separate coarser from finer material in the milled product based upon the predetermined size selection. For example, the sieve 135 can process the milled product received from the mill 125 where a plurality of particles passes through the sieve 135 to provide the first output and where the sieve 135 retains the plurality of abraded fragments to provide the second output. Various configurations can be used for the sieve 135, including various shapes, sizes, and opening dimensions. One or more sieves 135 having different opening sizes can be used to allow for intermediate or stepwise separation of particle volumes. The separator 115 can employ a sieve of metal wire or plastic mesh held in a frame that can be readily exchanged, removed for cleaning, or replaced with a different sieve 135 to provide a different predetermined size selection. Various size separation techniques can be employed in the separator 115 to apply the predetermined size selection to the milled product. For example, the separator 115 can employ one or more sieves 135 in a vibrational sieving process, a horizontal sieving process, a tap sieving process, and an air jet sieving process. Various sieve opening sizes can be related to a mesh number, as known in the art. In certain embodiments, the sieve 135 can have a mesh size not greater than about 3, and in particular embodiments, the sieve 135 can have a mesh size of about 3. It has been found that a metal sieve 135 of a mesh size of 3 can provide durability in processing the milled product, where the gauge of metal wires that can be used in forming the 3 mesh sieve are resistant to impact from abraded discs of chips of electronic waste, while at the same time providing more rapid and efficient pass-through of abraded particles based upon the opening size. Examples of the separator 115 include those manufactured by Carrier (Farmington, Conn.).

The following table provides examples of certain sieve designations and nominal sieve openings.

| Sieve Designation | | Nominal Sieve Opening | |
|---|---|---|---|
| Standard | Mesh | inches | mm |
| 25.4 mm | 1 in. | 1.00 | 25.4 |
| 22.6 mm | ⅞ in. | 0.875 | 22.6 |
| 19.0 mm | ¾ in. | 0.750 | 19.0 |
| 16.0 mm | ⅝ in. | 0.625 | 16.0 |
| 13.5 mm | 0.530 in. | 0.530 | 13.5 |
| 12.7 mm | ½ in. | 0.500 | 12.7 |
| 11.2 mm | 7/16 in. | 0.438 | 11.2 |
| 9.51 mm | ⅜ in. | 0.375 | 9.51 |
| 8.00 mm | 5/16 in. | 0.312 | 8.00 |
| 6.73 mm | No. 3/0.265 in. | 0.265 | 6.73 |
| 6.35 mm | ¼ in. | 0.250 | 6.35 |
| 5.66 mm | No. 3½ | 0.223 | 5.66 |
| 4.76 mm | No. 4 | 0.187 | 4.76 |
| 4.00 mm | No. 5 | 0.157 | 4.00 |
| 3.36 mm | No. 6 | 0.132 | 3.36 |
| 2.83 mm | No. 7 | 0.111 | 2.83 |

Aspects of the skid 120 can include the following features. The skid 120 can be configured to fit within a shipping container 140. As such, where the system includes a shipping container 140, the skid 120 can be disposed therein. The shipping container can be a "20 foot" shipping container having a length of about 20 feet, a width of about 8 feet, and a height of about 8.5 feet. Alternatively, the shipping container 140 can be assembled around the skid 120. It is also possible that the skid 120 and the shipping container 140 are assembled and/or formed as an integrated structure or unitary structure, where in such embodiments it may not be possible to separate the skid 120 from the shipping container 140. A sound damping material 145 can be coupled to one or both of the skid 120 and the shipping container 140, where the embodiment in FIG. 6 includes sound dampening material 145 that is coextensive with the walls of the shipping container 140. In this way, noise and vibration produced by the mill 110 and the separator 115 can be dampened. Various types of sound dampening material 145 can be employed, including foam panels (e.g., semirigid and flexible foam paneling), various other types of porous absorbers, batts of mineral wool or fiberglass, various fabrics, coatings, tiles, etc.

A dumper 150 can be included in the system 100, where aspects of the dumper 150 can include the following features. The dumper 150 can configured to provide the electronic waste substrate to the shredder 105. For example, the dumper 150 can be configured to elevate the electronic waste substrate and provide the electronic waste substrate to the shredder 105 using gravity. That is, the dumper 150 can lift the electronic waste substrate and dump it into the shredder 105. Other means can be used to transfer electronic waste to the shredder 105, including configuring the system 100 so that a conveyor or chute feeds the electronic waste to the shredder 105. Alternatively, the electronic waste to the shredder 105 manually or by using a front end loader. The dumper 150, however, can be configured to receive a load of electronic waste that is sized for the shredder 105 and/or is sized for the mill 110, particularly the container 125 of the mill. The dumper 150 can also be aligned with the shredder 105 and can have a bin or receptacle that cooperates with an aperture of the shredder 105 to maximize transfer of the electronic waste to the shredder 105 and minimize any spillage. Examples of the dumper 150 include those manufactured by International Material Control Solutions (Holland, Mich.).

A dust collector 155 can be included in the system 110, where aspects of the dust collector 155 can include the following features. The dust collector 155 can be configured to collect and store airborne dust generated by the system 100. For example, the dust collector 155 can be configured to exchange the air around the shredder 105, the mill 110, and the separator 115 and retain airborne particulate within one or more filters. Where the system 100 includes the shipping container 140, the dust collector 155 can be configured to exchange the air within the shipping container 140. Embodiments further include where the dust collector 155 can maintain a negative pressure within the shipping container 140 to minimize escape of airborne particulate outside of the shipping container 140 of the system 100. The dust collector 155 can include one or more filters and/or dust capture receptacles to store accumulated airborne particulate. Such filters and receptacles can be replaced and/or emptied as necessary to maintain performance of the dust collector 155. Captured dust can be directed to and combined with the first output of the separator 115 that includes the plurality of particles. The dust collector 155 can further minimize exposure to airborne particulate to improve operator safety and can minimize flammability and contamination hazards. Examples of the dust collector 155 include those manufactured by Donaldson Company, Inc. (Bloomington, Minn.).

Figure 2:
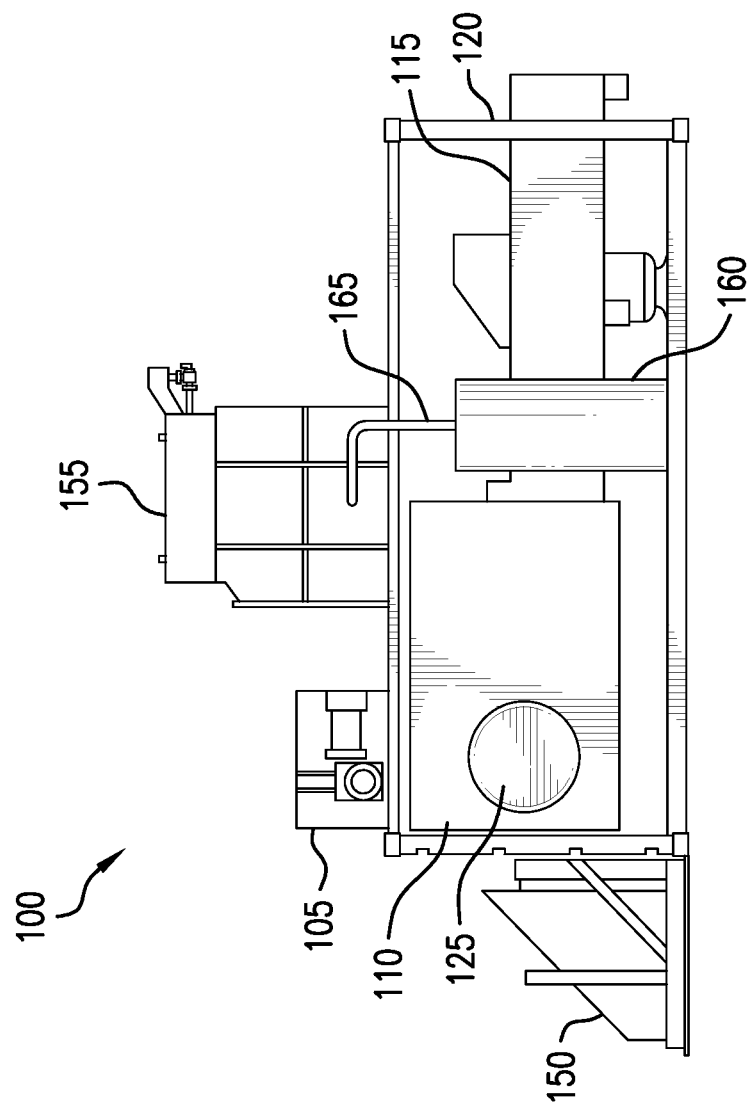
FIG. 2 is a side elevational view of the system further including a dumper.

An air compressor 160 can also be provided in the system 100 where the air compressor 160 is fluidly coupled to the dust collector 155 to remove dust from one or more filters of the dust collector 155. The air compressor 160 can be a stand-alone unit, as shown in FIGS. 1-2, which is connected via conduit 165 to the dust collector 155 to provide compressed air thereto. Alternatively, the air compressor 160 can be integrated into the dust collector 155. By using compressed air provided by the air compressor 160, the dust collector 155 can regenerate one or more filters used to capture dust and accordingly reuse the one or more filters.

Captured dust can be directed to and combined with the first output of the separator 115 that includes the plurality of particles. Examples of the air compressor 160 include those manufactured by Ingersoll-Rand plc (Dublin, Ireland).

Figure 6:
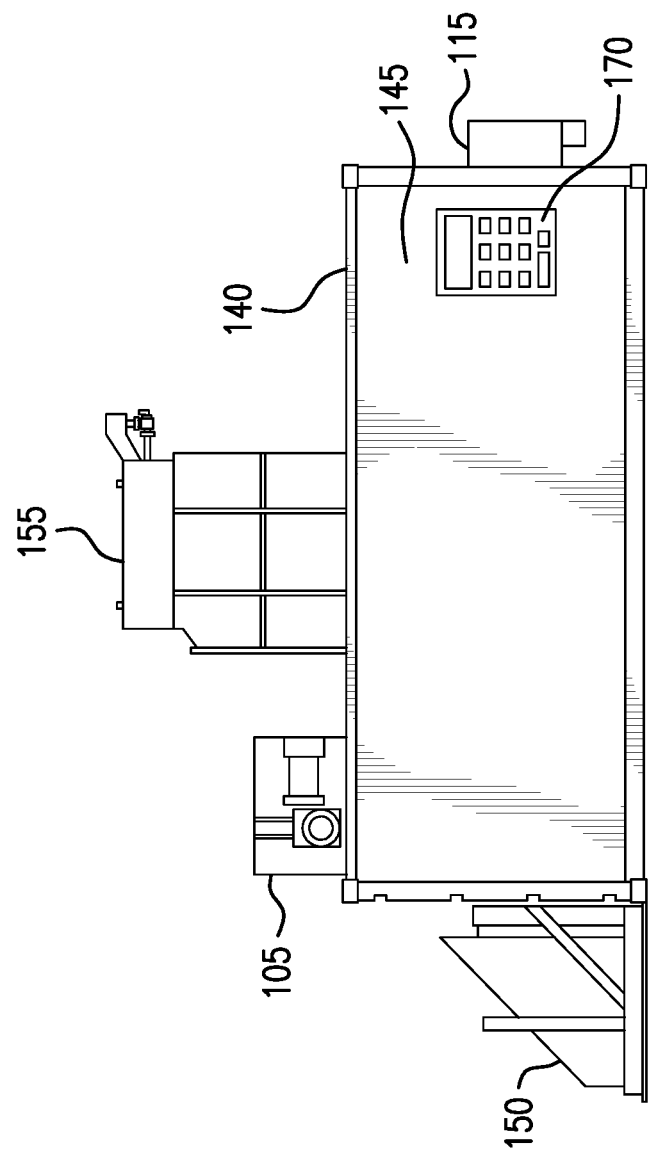
FIG. 6 is a side elevational view of the system further including a shipping container.

The system 100 can include a controller 170, where aspects of the controller 170 can include the following features. The controller 170 can be configured to control operation of the shredder 105, the mill 110, and the separator 115. Where applicable, the controller 170 can also control operation of the dumper 150, the dust collector 155, and/or the air compressor 160. The controller 170 can include various status indicators and diagnostics; e.g., on/off, component timers, hour meters, batch counters, maintenance reminders, speed/pressure meters, etc. As shown in FIG. 6, the controller 170 is located on an exterior wall of the shipping container 140; however, the controller 170 can be placed in other locations. It is also possible to have the controller 170 hardwired and/or wirelessly connected to control the various operations of the system 100 components; e.g., the shredder 105, the mill 110, the separator 115, the dumper 150, the dust collector 155, and/or the air compressor 160.

Accordingly, the system 100 provides outputs from the separator 115 that can be further processed to recover and recycle minerals and metals from electronic waste; e.g., the plurality of particles separated from the plurality of abraded fragments. For example, the plurality of particles obtained by processing printed circuit boards using the present technology can be fed into the precious metal recovery apparatus and related processes described in U.S. patent application Ser. No. 16/152,672 to Pedziwiatr, filed on Oct. 5, 2018 (hereinafter "Pedziwiatr") and Patent Cooperation Treaty Appl. No. PCT/US2019/021786 to Pedziwiatr, filed on Mar. 12, 2019, which are incorporated herein by reference. In brief, the plurality of particles, which can also be referred to as powder derived from processing printed circuit boards, can be directed into leaching and harvesting systems and methods that employ a system of tanks, filters, and liquids. A leach tank can receive and mix the powder with a leaching solution. A settling tank equipped with a solid-liquid separation system can process the wet mixture and feeds wet solids into a rinse/conveying system column. The solids can be conveyed into a collection bin and the precious metal-rich liquid can be transferred to harvest for further processing. Precious metal-rich liquid can be processed by removing precious metal (e.g. gold) and returning precious metal-free (e.g. gold-free) liquid to the prior leach operation. Harvest can be carried out by an electrowinning unit, as described by Pedziwiatr.

Methods for obtaining a mineral rich powder from an electronic waste substrate are provided that can employ the various systems provided herein. Such methods can include receiving the electronic waste substrate with a shredder and processing the electronic waste substrate into a plurality of fragments. The plurality of fragments can be received in a container of a mill, the container can include a milling media, and the mill can abrade the plurality of fragments with the milling media to produced a milled product. The milled product can be received by a separator, where the separator can apply a predetermined size selection to the milled product to provide a first output including a plurality of particles and a second output including a plurality of abraded fragments. A skid can be coupled to and can provide structural support for the shredder, the mill, and the separator.

The present technology provides certain benefits and advantages. The systems described herein provide self contained and easily transportable units that can be additive or scalable based upon the amount of electronic waste to process. Uniform outputs permit standardized and optimized recovery of minerals and metals from electronic waste. Issues related to noise and/or dust can minimized. Recovery and reuse of minerals and metals can be economically and environmentally advantageous. Where electronic devices include electronic data storage, the present technology can effectively destroy embedded data by transforming printed circuit boards and other electronic waste into particles and abraded fragments. Industry standards for recycling may require multi-touch size reduction to produce the same result as the present technology provided herein. As such, the present technology provides an improved means to completely process a batch of electronic waste, as opposed to multistep processes that may also occur at more than one location. The systems and methods provided by the present technology are smaller, lighter, less expensive, more economical, better for the environment, transportable, and safer for operators than other systems and methods.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for obtaining a mineral rich powder from an electronic waste substrate, the system comprising:
   a shredder configured to receive the electronic waste substrate and cut the electronic waste substrate into a plurality of uniform fragments, wherein the shredder comprises one or more cutting shafts, wherein the one or more cutting shafts comprise cutting elements, and wherein the shredder comprises one or more apertures, comprising a grate or a screen, configured to retain the electronic waste substrate until a desired fragment size is achieved;
   a mill, coupled to the shredder, including a container configured to receive the plurality of uniform fragments from the shredder, the container including a milling media, the mill configured to abrade the plurality of fragments with the milling media to produce a milled product;
   a separator, coupled to the mill, configured to receive the milled product from the mill, the separator configured to apply a predetermined size selection to the milled product to provide a first output including a plurality of particles and a second output including a plurality of abraded fragments, wherein the separator comprises one or more sieves, and wherein the one or more sieves have a mesh size between No. 3 and No. 7; and
   a skid coupled to and providing structural support for the shredder, the mill, and the separator, the skid comprising a frame with a plurality of upright members, a plurality of upper frame members, a plurality of lower frame members, and a solid bottom within the plurality of lower frame members.

2. The system of claim 1, wherein the electronic waste substrate includes a printed circuit board.

3. The system of claim 1, wherein the plurality of uniform fragments each have a longest dimension of about 1 inch.

4. The system of claim 1, wherein the container of the mill is cylindrical and agitated by an electric motor.

5. The system of claim 1, wherein the milling media includes a plurality of rods.

6. The system of claim 5, wherein the plurality of rods includes a member selected from the group consisting of: a metal rod having about a ¾ inch diameter, a metal rod having about a 2 inch diameter, and combinations thereof.

7. The system of claim 1, wherein the skid is configured to fit within a shipping container.

8. The system of claim 7, further comprising a shipping container, wherein the skid is disposed within the shipping container.

9. The system of claim 8, wherein the shipping container has a length of about 20 feet, a width of about 8 feet, and a height of about 8.5 feet.

10. The system of claim 8, further comprising a sound damping material coupled to one of the skid and the shipping container.

11. The system of claim 1, further comprising a dumper configured to provide the electronic waste substrate to the shredder.

12. The system of claim 11, wherein the dumper is configured to elevate the electronic waste substrate and provide the electronic waste substrate to the shredder using gravity.

13. The system of claim 1, further comprising a dust collector configured to collect and store airborne dust generated by the system.

14. The system of claim 13, further comprising an air compressor fluidly coupled to the dust collector to remove dust from a filter of the dust collector.

15. The system of claim 1, further comprising a controller configured to control operation of the shredder, the mill, and the separator.

16. A system for obtaining a mineral rich powder from an electronic waste substrate, the system comprising:
   a shipping container, comprising a bottom, a top, and four walls forming an interior of the shipping container;
   a skid integrated into the interior of the shipping container, the skid comprising a frame with a plurality of upright members, a plurality of upper frame members, a plurality of lower frame members, and a solid bottom within the plurality of lower frame members;
   a dumper, coupled the shipping container, configured to receive the electronic waste substrate, the electronic waste substrate including a printed circuit board, wherein the dumper is further configured to provide the electronic waste substrate to a shredder via a lift feed, a conveyer feed, or a chute feed; wherein the shredder, coupled to and supported by the skid,
   configured to receive the electronic waste substrate from the dumper, the shredder configured to cut the electronic waste substrate into a plurality of uniform fragments, wherein the shredder comprises one or more cutting shafts, wherein the one or more cutting shafts comprise cutting elements, and wherein the shredder comprises one or more apertures, comprising a grate or a screen, configured to retain the electronic waste substrate until a desired fragment size is achieved;

a mill, coupled to the shredder and coupled to and supported by the skid, including a cylindrical container configured to receive the plurality of uniform fragments from the shredder, the container including a milling media including a plurality of rods, the mill configured to abrade the plurality of fragments with the milling media to produce a milled product;

a separator, coupled to the mill and coupled to and supported by the skid, configured to receive the milled product from the mill, the separator configured to apply a predetermined size selection using a sieve to the milled product to provide a first output including a plurality of particles and a second output including a plurality of abraded fragments, wherein the separator comprises one or more sieves, and wherein the one or more sieves have a mesh size between No. 3 and No. 7;

a dust collector, housed on or within the shipping container, configured to collect and store airborne dust generated by the system;

an air compressor fluidly coupled to the dust collector to remove dust from a filter of the dust collector; and a controller, communicatively coupled to and configured to control operation of the dumper, the shredder, the mill, the separator, the dust collector, and the air compressor.

* * * * *